United States Patent
Yang et al.

(10) Patent No.: US 11,287,542 B2
(45) Date of Patent: Mar. 29, 2022

(54) SEISMIC DATA PROCESSING INCLUDING SURFACE MULTIPLE MODELING FOR OCEAN BOTTOM CABLE SYSTEMS

(71) Applicant: CGG SERVICES SA, Massy (FR)

(72) Inventors: Kunlun Yang, Singapore (SG); Barry Hung, Singapore (SG)

(73) Assignee: CGG SERVICES SAS, Massy (FR)

( * ) Notice: Subject to any disclaimer, the term of this patent is extended or adjusted under 35 U.S.C. 154(b) by 234 days.

(21) Appl. No.: 15/110,325

(22) PCT Filed: Jan. 13, 2015

(86) PCT No.: PCT/IB2015/000235
§ 371 (c)(1),
(2) Date: Jul. 7, 2016

(87) PCT Pub. No.: WO2015/104639
PCT Pub. Date: Jul. 16, 2015

(65) Prior Publication Data
US 2016/0327669 A1 Nov. 10, 2016

Related U.S. Application Data

(60) Provisional application No. 61/926,702, filed on Jan. 13, 2014.

(51) Int. Cl.
*G01V 1/36* (2006.01)
*G01V 1/38* (2006.01)

(52) U.S. Cl.
CPC ............. *G01V 1/36* (2013.01); *G01V 1/3852* (2013.01); *G01V 2210/675* (2013.01)

(58) Field of Classification Search
CPC ........ G01V 1/003; G01V 1/3808; G01V 1/36; G01V 1/3852; G01V 2210/675
See application file for complete search history.

(56) References Cited

U.S. PATENT DOCUMENTS

2008/0259726 A1* 10/2008 van Manen .............. G01V 1/36
367/24
2013/0028051 A1* 1/2013 Barkved ................ G01V 1/288
367/40

OTHER PUBLICATIONS

Ramirez et al., Green's theorem as a comprehensive framework for data reconstruction, regularization, wavefield separation, seismic interferometry, and wavelet estimation: A tutorial, Geophysics, vol. 74, No. 6 Nov.-Dec. 2009, p. W35-W62, Dec. 15, 2009.*

(Continued)

*Primary Examiner* — Kyle R Quigley
(74) *Attorney, Agent, or Firm* — Patent Portfolio Builders PLLC

(57) ABSTRACT

A system and method are disclosed for predicting, and optionally removing surface multiples from acquired seismic data that lacks surface consistency, such as seismic data acquired using an Ocean Bottom Cable (OBC) or Ocean Bottom Node (OBN) system where the sources are located at or near the water's surface and the receivers are located at or near the ocean's floor. By processing the acquired seismic data using seismic interferometry, source side and/or receiver side operators can be generated which satisfy the surface consistency requirement of techniques such as Surface Related Multiple Elimination (SRME) so that SRME or the like can be used to predict the surface multiples.

18 Claims, 9 Drawing Sheets

(56) References Cited

OTHER PUBLICATIONS

McLendon, Types of offshore oil rigs, Mother Nature Network, May 19, 2010.*
G. T. Schuster, et al.; "Interferometric/Daylight seismic imaging"; Geophysical Journal International, vol. 157, Issue 2; Jan. 16, 2004; pp. 838-852.
International Search Report in related International Application No. PCT/IB2015/000235, dated Jun. 26, 2015.
Written Opinion of the International Searching Authority in related International Application No. PCT/IB2015/000235, dated Jun. 26, 2015.
L. Ikelle, "Combining Two Seismic Experiments to Attenuate Free-Surface Multiples in OBC Data", Geophysical Prospecting, 1999, vol. 47, pp. 179-193.
J. Jiao et al., "Robust Summation of Dual-Sensor Ocean-Bottom Cable Data", SEG Expanded Abstracts, 1998.
H. Jin et al., "Model-Based Water-Layer Demultiple (MWD) for Shallow Water: from Streamer to OBS", SEG Annual Meeting, Las Vegas, Nevada, 2012, pp. 1-5.
J. Ma et al., "OBS Multiple Attenuation Technique Using SRME Theory", SEG Annual Meeting, Denver, Colorado, 2010, pp. 3473-3477.
E. Otnes et al., "Data Driven Surface-Related Multiple Elimination on Walkaway VSP Data", EAGE 68th Conference & Exhibition, Vienna, Austria, Jun. 12-15, 2006.
A. Pica et al., "3D SRME on OBS Data Using Waveform Multiple Modelling", SEG Annual Meeting, New Orleans, Louisiana, 2006, pp. 2659-2663.
R. Soubaras, "Ocean Bottom Hydrophone and Geophone Processing", SEG Expanded Abstracts, 1996, pp. 24-27.
D.J. Verschuur et al., "Integration of OBS Data and Surface Data for OBS Multiple Removal", SEG Expanded Abstracts, 1999.
K. Wapenaar et al., "Green's Function Representations for Seismic Interferometry", GEOPHYSICS, Jul.-Aug. 2006, vol. 71, No. 4, pp. S133-S146.
K. Wapanaar et al., "Seismic Interferometry: a Comparison of Approaches", SEG International Exposition and 74th Annual Meeting, Denver, Colorado, Oct. 10-15, 2004.
Written Opinion received in corresponding Singapore Application No. 11201605696Y, dated Jul. 18, 2017. All references cited therein have been previously made of record.
Office Action in Singapore Application No. 11201605696Y dated Jul. 3, 2018. (All references not cited herewith have been previously made of record.).
Written Opinion in Singapore Application No. 11201605696Y dated Apr. 12, 2019. (All references not cited herewith have been previously made of record.).
Communication pursuant to Article 94(3) EPC, in related/corresponding European Application No. 15 709 991.2 dated Feb. 8, 2021.

* cited by examiner

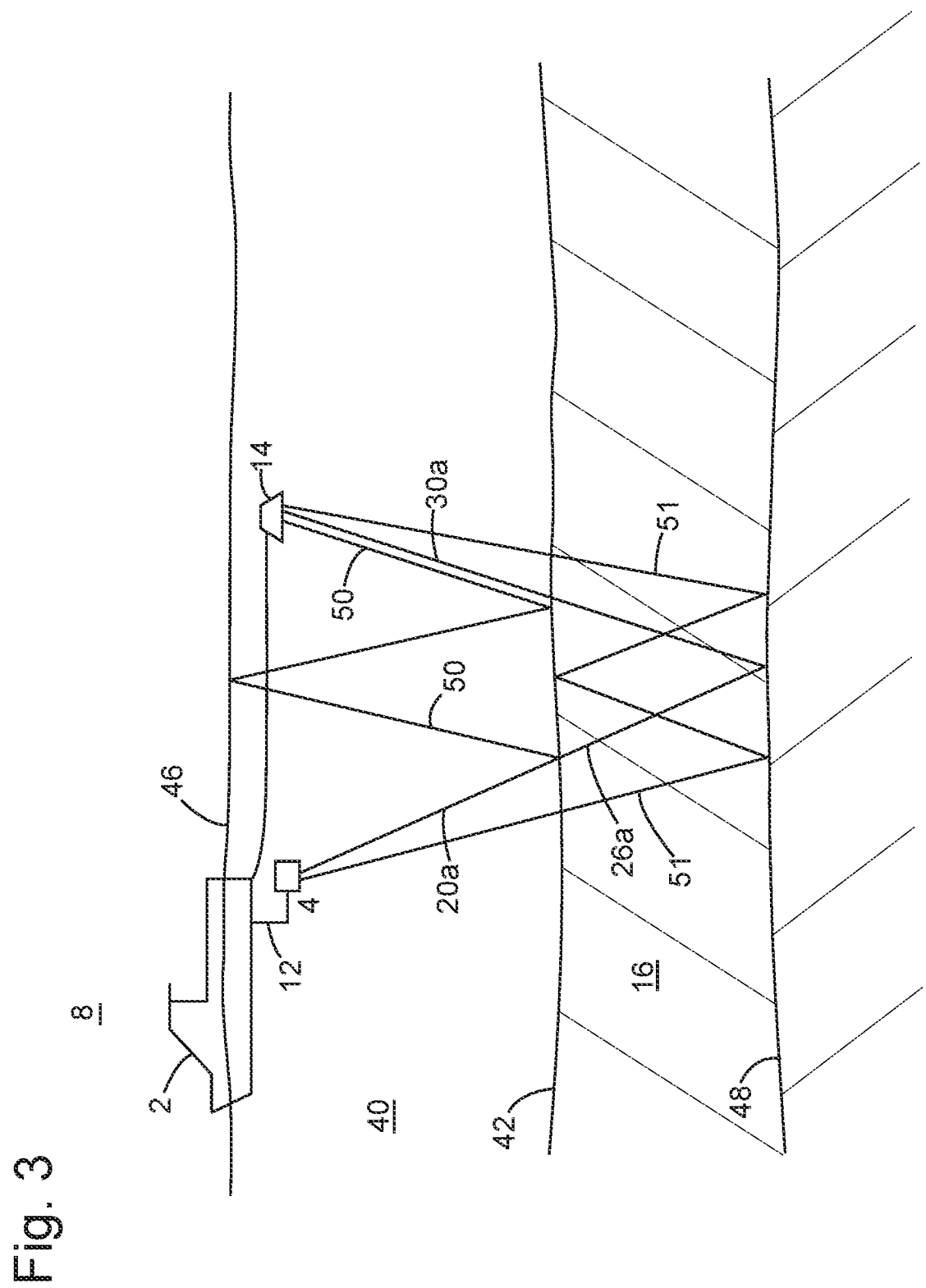

SEISMIC DATA PROCESSING INCLUDING SURFACE MULTIPLE MODELING FOR OCEAN BOTTOM CABLE SYSTEMS

PRIORITY INFORMATION

The present application claims priority under 35 U.S.C. §119(e) to U.S. Provisional Patent Application Ser. No. 61/926,702, filed Jan. 13, 2014, the entire contents of which are expressly incorporated herein by reference.

TECHNICAL FIELD

The present invention relates generally to seismic exploration, and more specifically to systems and methods for removing the influence of multiple reflections in processing acquired seismic data in seismic acquisition systems where the sources and receivers are substantially spaced apart relative to a free surface.

BACKGROUND

A widely used technique for searching for oil or gas is the seismic exploration of subsurface geophysical structures. The seismic exploration process consists of generating seismic waves (i.e., sound waves) directed toward the subsurface area, gathering data on reflections of the generated seismic waves at interfaces between layers of the subsurface, and analyzing the data to generate a profile (image) of the geophysical structure, i.e., the layers of the investigated subsurface. This type of seismic exploration can be used both on the subsurface of land areas and for exploring the subsurface of the ocean floor.

It is known by those of ordinary skill in the art of seismic exploration that a sound producing device can be used to generate seismic waves whose reflections can, in turn, be used to determine the possible or probable location of hydrocarbon deposits under, e.g., the ocean floor. The sound producing device in such marine applications is generally also called a "source," i.e., a source of the sound waves that are transmitted and then reflected/refracted off the ocean floor and then received by one or more, usually dozens, of receivers. Marine seismic systems can be implemented in what are referred to as "towed arrays" of a plurality of sources and receivers, wherein each towed array can include numerous source (e.g., air guns or vibrators), numerous receivers, and can include several or more groups of receivers, each on its own cables, with a corresponding source, again on its own cable. Systems and methods for their use have been produced for devices that can maintain these cables, for example, in relatively straight lines as they are being towed behind ships in the ocean. As those of ordinary skill in the art can appreciate, an entire industry has been created to explore the oceans for new deposits of hydrocarbons, and has been referred to as "reflection seismology."

For this type of seismic gathering process, as shown in FIG. 1, a data acquisition system 10 includes a ship 2 towing plural streamers 6 that may extend over kilometers behind ship 2. Each of the streamers 6 can include one or more birds 13 that maintains streamer 6 in a known fixed position relative to other streamers 6, and the birds 13 are capable of moving streamer 6 as desired according to bi-directional communications birds 13 can receive from ship 2. One or more source arrays 4a,b may be also towed by ship 2 or another ship for generating seismic waves. Source arrays 4a,b can be placed either in front of or behind receivers 14, or both behind and in front of receivers 14. The seismic waves generated by source arrays 4a,b propagate downward, reflect off of, and penetrate the seafloor, wherein the refracted waves eventually are reflected by one or more reflecting structures (not shown in FIG. 1) back to the surface (see FIG. 2, discussed below). The reflected seismic waves propagate upwardly and are detected by receivers 14 provided on streamers 6. This process is generally referred to as "shooting" a particular seafloor area, and the seafloor area can be referred to as a "cell".

FIG. 2 illustrates a side view of the data acquisition system 10 of FIG. 1. Ship 2, located on ocean surface 46, tows one or more streamers 6, that is comprised of cables 12, and a plurality of receivers 14. Shown in FIG. 2 are two source streamers, which include sources 4a,b attached to respective cables 12a,b. Each source 4a,b is capable of transmitting a respective sound wave, or transmitted signal 20a,b. For the sake of simplifying the drawings, but while not detracting at all from an understanding of the principles involved, only a first transmitted signal 20a will be shown (even though some or all of source 4 can be simultaneously (or not) transmitting similar transmitted signals 20). First transmitted signal 20a travels through ocean 40 and arrives at first refraction/reflection point 22a. First reflected signal 24a from first transmitted signal 20a travels upward from ocean floor 42, back to receivers 14. As those of skill in the art can appreciate, whenever a signal —optical or acoustical—travels from one medium with a first index of refraction $n_1$ and meets with a different medium, with a second index of refraction $n_2$, a portion of the transmitted signal is reflected at an angle equal to the incident angle (according to the well-known Snell's law), and a second portion of the transmitted signal can be refracted (again according to Snell's law).

Thus, as shown in FIG. 2, first transmitted signal 20a generates first reflected signal 24a, and first refracted signal 26a. First refracted signal 26a travels through sediment layer 16 (which can be generically referred to as first subsurface layer 16) beneath ocean floor 42, and can now be considered to be a "new" transmitted signal, such that when it encounters a second medium at second refraction/reflection point 28a, a second set of refracted and reflected signals 32a and 30a, are subsequently generated. Further, as shown in FIG. 2, there happens to be a significant hydrocarbon deposit 44 within a third medium, or solid earth/rock layer 18 (which can be generically referred to as second subsurface layer 18). Consequently, refracted and reflected signals are generated by the hydrocarbon deposit, and it is the purpose of data acquisition system 10 to generate data that can be used to discover such hydrocarbon deposits 44.

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples. Signal 50a shown in FIG. 2 is one such example of a multiple, but as shown in FIG. 3, there are other ways for multiples to be generated.

As illustrated in FIG. 3, seismic source 4 produces first transmitted wave 20a that splits into a primary transmitted wave 26a (referred to also as first refracted signal) penetrating inside first subsurface layer 16 (referred to also as "sediment layer" though that does not necessarily need to be the case) under ocean floor 42, and surface related multiple signal 50 that travels back towards ocean surface 46 (or fourth interface). Primary transmitted wave 26a is reflected once at second interface 48 between different layers in first subsurface layer 16 and travels back to receiver 14 as second reflected signal 30a. Surface related multiple signal 50 also reaches receiver 14, but at a different time, after being reflected (at least) two more times: a first reflection at surface 46 and a second reflection at sea floor 42. Thus, receiver 14 will receive at least two different signals from the same transmitting event: second reflected signal 30a, and surface related multiple signal 50. Surface related multiple signal 50 can be received by receiver 14 either before second reflected signal 30a, at the same time, or after, depending on how far first refracted signal 26a traveled in first subsurface layer 16, and how deep ocean 40 is at the point of transmission and reflection/refraction. Thus, receiver 14 will record signals which do not accurately portray the subsurface environment due to surface multiple signal(s) 50.

Thus multiples, as will be appreciated by those skilled in the art, can cause problems with determining the true nature of the geology of the earth below the ocean floor when processing the recorded seismic data. Multiples do not typically add any useful information about the geology beneath the ocean floor, and thus they are, in essence, noise, and it is desirable to eliminate them and/or substantially reduce and/or eliminate their influence in signal processing of the other reflected signals so as to correctly ascertain the presence (or the absence) of underground/underwater hydrocarbon deposits.

Numerous techniques have been developed for the removal of multiples from acquired seismic data. One particularly useful technique is known as Surface Related Multiple Elimination (SRME), which predicts surface multiples by performing a convolutional process on the recorded seismic data. Once predicted, the multiples can then be subtracted from the recorded data. SRME requires no knowledge of the subsurface to predict the surface multiples, but does require certain characteristics in the data acquisition. Among other things, this latter point includes the requirement that the sources and receivers are both relatively close to the surface (i.e., water surface) which is causing the multiples.

Thus, while SRME is a relatively ideal technique for removing surface multiples from data recorded using towed array acquisitions, it does not work properly for marine acquisitions where the sources and receivers are spaced relatively far apart, such as ocean bottom node (OBN)/ocean bottom cable (OBC) acquisitions. In these types of seismic acquisition systems, the receivers are typically located on the ocean floor and the sources are typically located on the ocean surface, which violates the surface consistency requirement imposed by SRME.

To avoid this problem, in some acquisitions it is possible to perform parallel recording of the seismic data with a towed streamer array and to add that data to the data gathered as a result of the OBN/OBC acquisition to satisfy the SRME surface consistency requirement. However it is not always possible to perform a parallel streamer acquisition due to cost or other factors.

Accordingly, it would be desirable to provide methods, modes and systems for enabling application of SRME to acquired seismic data which is not surface consistent and for which companion streamer data is not available.

SUMMARY

Various embodiments described herein address at least one of the problems and/or disadvantages discussed above. It is therefore a general aspect of the embodiments to provide a system and method for predicting surface multiples using surface inconsistent seismic data and without needing to perform a companion streamer survey.

According to a first aspect of the embodiments, a method for processing seismic data includes the steps of receiving seismic data which was generated using sources and receivers, performing seismic interferometry on the received seismic data to generate additional seismic data, and using the received seismic data and the additional seismic data to predict multiples in the received seismic data.

According to a second aspect of the embodiments, a system for processing seismic data includes a processor configured to receive seismic data which was generated using sources and receivers, and to perform seismic interferometry on the received seismic data to generate additional seismic data, wherein the processor uses the received seismic data and the additional seismic data to predict multiples in the received seismic data.

According to a third aspect of the embodiments, a computer-readable medium containing program instructions which, when executed on a suitably programmed computer processing device, perform the steps of: receiving seismic data which was generated using sources and receivers, performing seismic interferometry on the received seismic data to generate additional seismic data; and using the received seismic data and the additional seismic data to predict multiples in the received seismic data.

BRIEF DESCRIPTION OF THE DRAWINGS

The above features will become apparent and more readily appreciated from the following description of the embodiments with reference to the following figures, wherein like reference numerals refer to like parts throughout the various figures unless otherwise specified, and wherein:

FIGS. 2 and 3 illustrate side views of the data acquisition system of FIG. 1;

DETAILED DESCRIPTION

Figure 1:
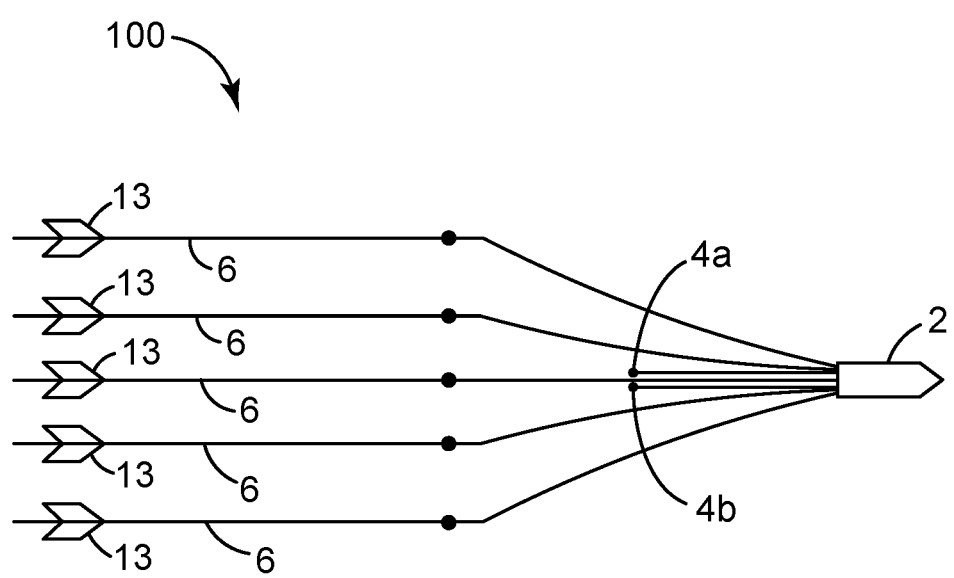
FIG. 1 illustrates a data acquisition system for use in a seismic gathering process.
Figure 2:
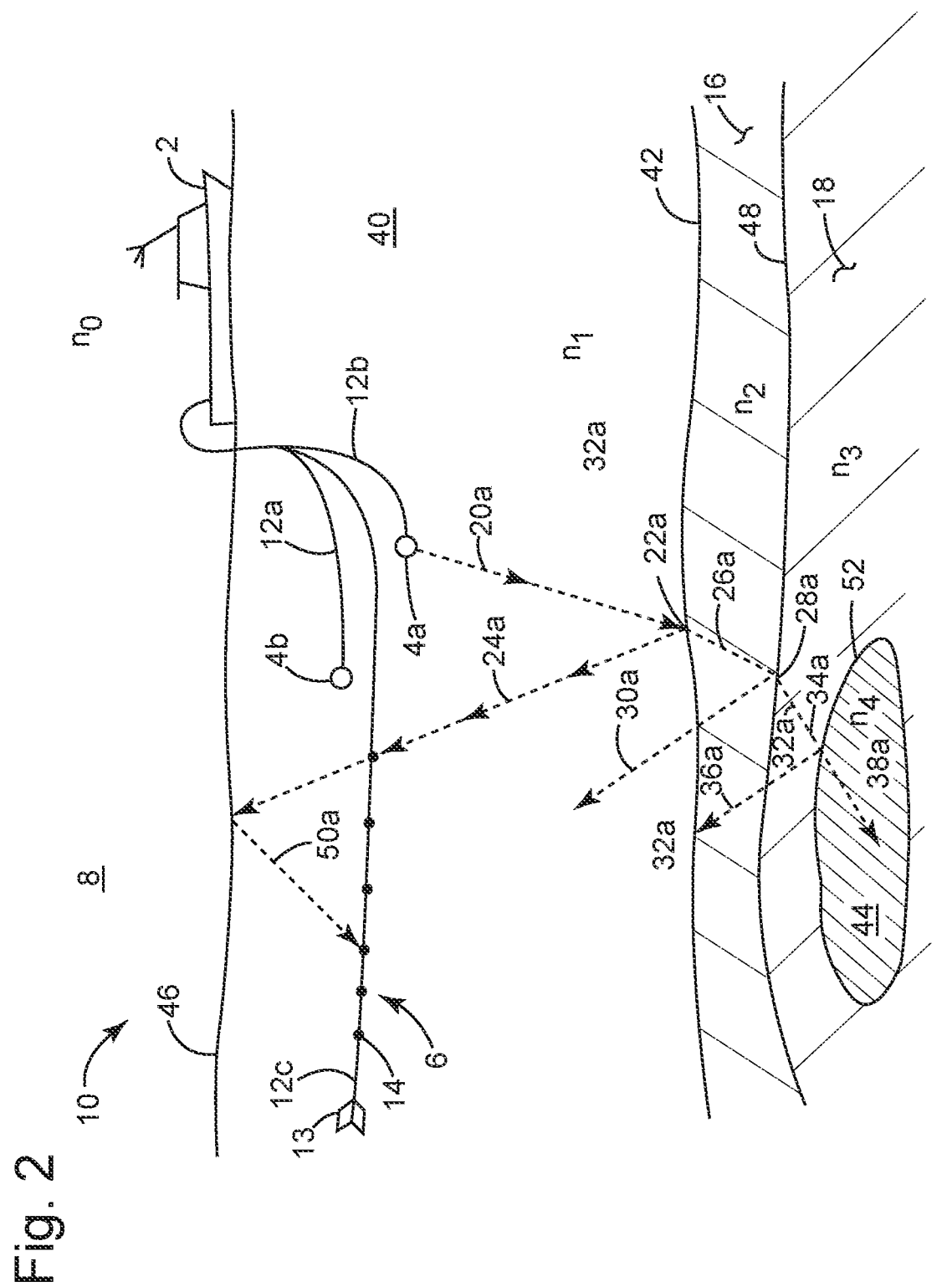

The inventive concept is described more fully hereinafter with reference to the accompanying drawings, in which embodiments of the inventive concept are shown. In the drawings, the size and relative sizes of layers and regions may be exaggerated for clarity. Like numbers refer to like elements throughout. This inventive concept may, however, be embodied in many different forms and should not be construed as limited to the embodiments set forth herein. The following embodiments are discussed, for simplicity, with regard to the terminology and structure of an underwater and undersea-floor seismic characteristic determination system using a system of seismic transmitters and receivers. However, the embodiments to be discussed next are not limited to these systems but may be applied to other seismic characteristic determination systems that utilize the same or similar types of seismic determination systems.

Reference throughout the specification to "one embodiment" or "an embodiment" means that a particular feature, structure, or characteristic described in connection with an embodiment is included in at least one embodiment. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

Instead of using parallel streamer acquisitions to record the surface consistent data which is needed to subsequently apply SRME to remove surface multiples, the embodiments described herein instead apply seismic interferometry to the acquired surface inconsistent data to generate the surface consistent data which is used to then apply SRME. The embodiments described herein refer to examples based on an OBC seismic acquisition system, however it should be appreciated that the embodiments include applications to any acquired seismic data where the surface consistency requirement of SRME is not met, i.e., any seismic data that has been acquired using sources and receivers that are not both located at (or substantially at) the water's surface. The source/receiver depthwise spacing can, for example, be at least a predetermined amount, e.g., at least 20 meters, although this is not required.

An example of an OBC system is illustrated below with respect to FIGS. 5(a) and 5(b). With this context in mind, once the surface inconsistent seismic data has been acquired, e.g., via an OBC acquisition system, a seismic interferometry can be performed to add to the acquired seismic data that was collected sufficient surface data for the SRME to be performed. Seismic interferometry generates new seismic responses by cross correlating observations, i.e., recorded seismic data, at different receiver locations. More specifically, the difficulty in applying SRME to the data collected by an OBC survey is due to the asymmetric ray paths of the recorded OBC data, which is the result of a lack of sources at the receiver positions and/or a lack of receivers at the source positions. Thus the ray paths of surface multiples cannot be constructed from primary waves as compared to seismic data recorded via streamer acquisition, where both sources and receivers are located at the sea surface. However, using the interferometry method, by cross-correlating two recordings of wave fields at two receiver positions, the Green's function that would have been be observed at one of the receiver positions if there had been an impulsive source at the other location can be generated without any a priori knowledge of subsurface in such a way as to fill in the data needed to perform SRME.

In more detail, the fundamental equation associated with performing seismic interferometry using the acquired OBC data to generate predicted seismic data for either hypothetical receivers located where the actual sources in the OBC system are located or hypothetical sources located where the actual receivers in the OBC system are located can be expressed as:

$$\mathcal{R}\{G(X_A, X_B, \omega)\} = \int_{\partial D} \frac{-1}{j\omega\rho(X)}$$
$$(G^*(X_A, X, \omega)\partial_i G(X_B, X, \omega) - \partial_i G^*(X_A, X, \omega)G(X_B, X, \omega))n_i d^2x$$

where $\mathcal{R}$ denotes the real part, G refers to Green's function, $\rho$ refers to density, n to normal direction of boundary, j to $\sqrt{-1}$ and $\omega$ to frequency; the super script * denotes to the complex conjugate; and X and D denote locations and an enclosed boundary as described below and shown in FIG. 4(a).

Figure 4A:
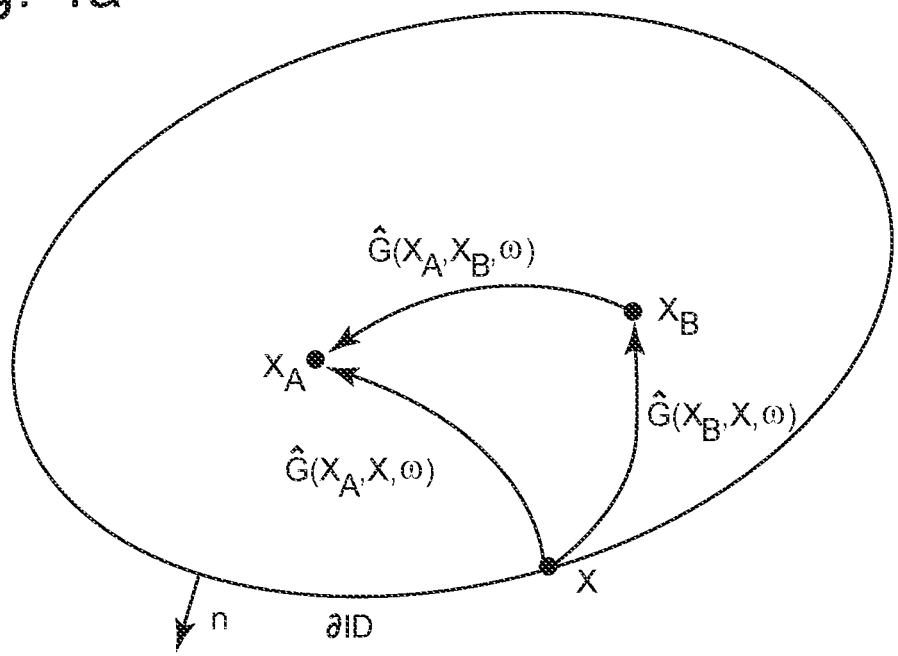
FIGS. 4A-4C depict various aspects of seismic interferometry.
Figure 4B:
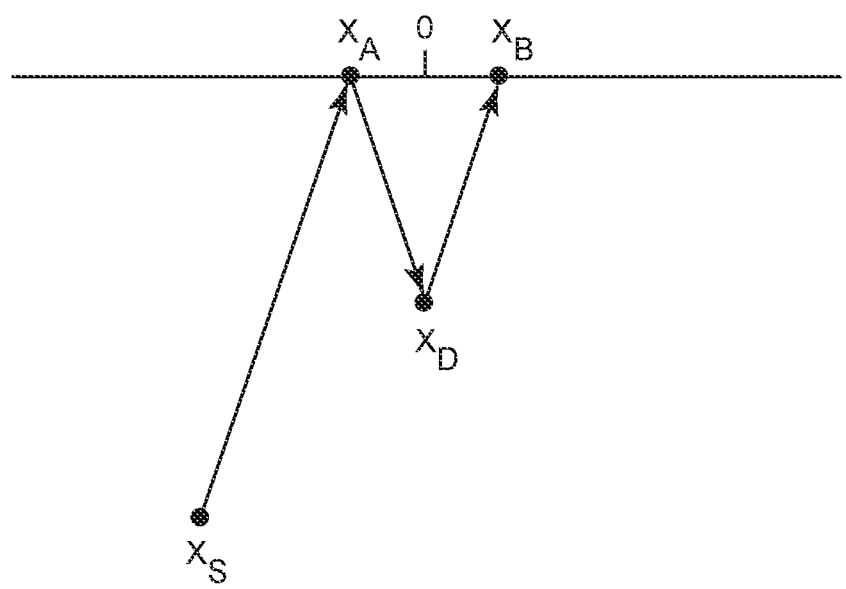
Figure 4C:
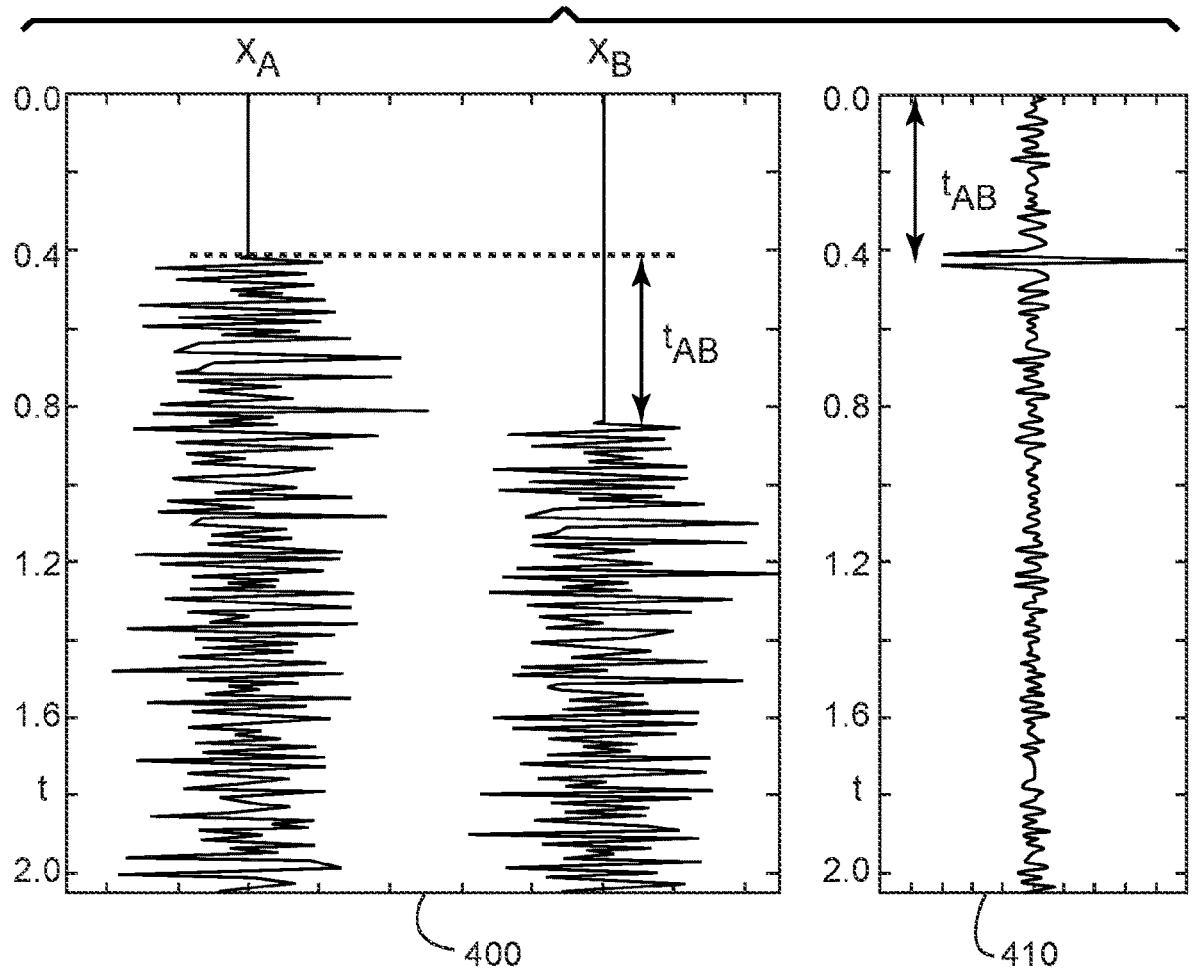

Performing seismic interferometry using the above equation provides an integration of cross-correlations for all of the scattering wave-field contributions, e.g., along an arbitrary boundary D that encloses two hypothetical receivers $X_A$ and $X_B$ as shown in FIG. 4(a) by integrating sources X along boundary D. This concept can also be illustrated in a half-plane, 1D representation as shown in FIG. 4(b) which shows the relationship between a random source $X_S$, a scatterer $X_D$ and two receivers located at $X_A$ and $X_B$. FIG. 4(c) shows trace data recorded by receivers $X_A$ and $X_B$ in plot 400 as well as the cross-correlation 410 between the recordings of the two receivers $X_A$ and $X_B$, where $t_{AB}$ is the travel time along the path from $X_A$ to $X_D$ to $X_B$. The cross-correlation 410 indicates an impulse response at point 0 in FIG. 4(b) between receivers $X_A$ and $X_B$ without actually firing a source $X_S$ at either receiver $X_A$ or $X_B$. Thus, for example, this technique can provide a predicted impulse response which is midway between two actual receivers for a hypothetical source. The interested reader can find more information regarding the general procedures associated with seismic interferometry in the article entitled "Seismic Interferometry: A Comparison of Approaches", to Kees Wapenaar et al., in SEG Expanded Abstracts, pp. 1981-1984, (2005), the disclosure of which is incorporated here by reference.

Figure 5A:
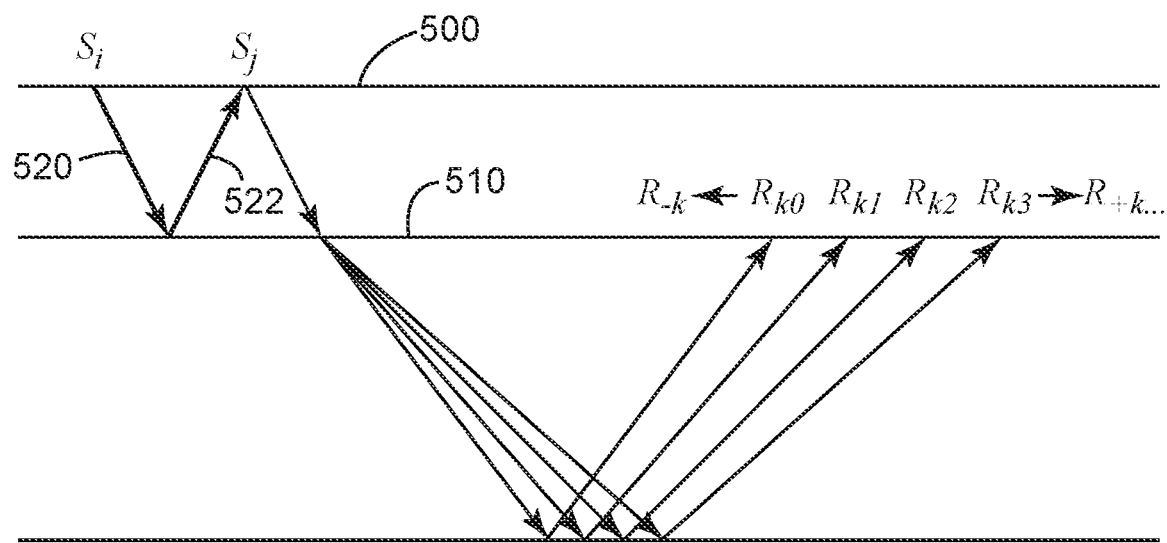
FIGS. 5A-5B depicts an application of seismic interferometry used to generate additional seismic data for an Ocean Bottom Cable (OBC) system.
Figure 5B:
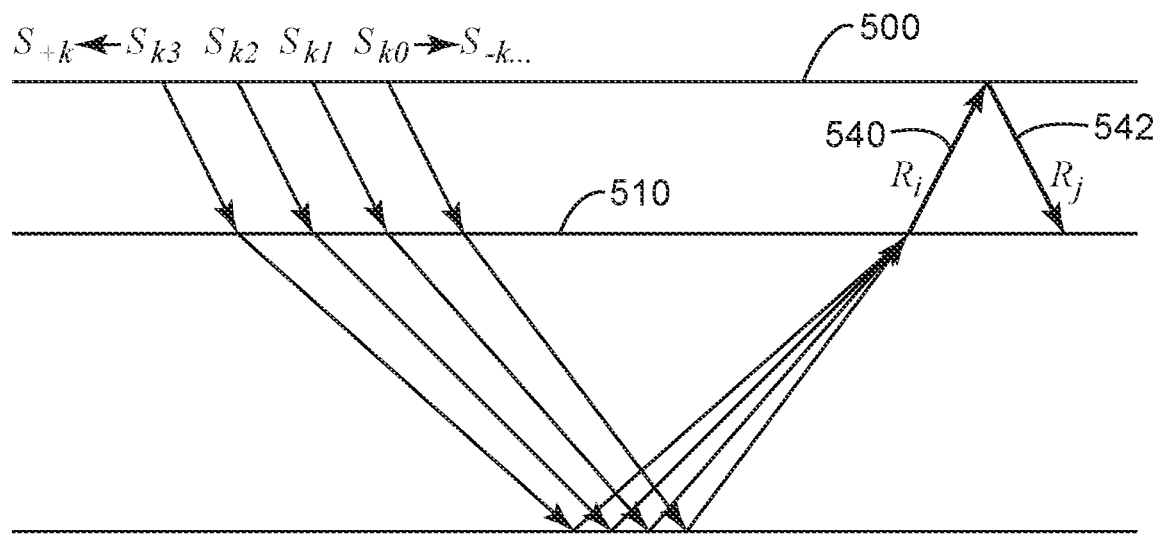

This general technique for seismic interferometry can now be applied according to an embodiment to the situation involving, e.g., OBC acquisition, as now described with respect to FIGS. 5(a) and 5(b) in order to obtain some additional, surface consistent acquisition data to aid in the subsequent application of SRME to remove surface multiples. More specifically, the OBC acquisition includes multiple shot points $S_k$ (only four of which are shown in FIG. 5(b)) located at the free (water) surface 500 and multiple receiver locations $R_k$ (only four of which are shown in FIG. 5(a)) located on the ocean floor 510. FIG. 5(a) illustrates the application of seismic interferometry to obtain the data associated with the raypath $S_iS_j$ 520, 522 which is not directly available from the OBC acquisition's recorded seismic data. In the example of FIG. 5(a), new seismic data is generated which is data that would have been recorded by the receivers, which are located at the ocean floor 510, if the receivers were instead located at the ocean surface 500. This new seismic data can be used, e.g., in conjunction with the originally acquired seismic data, to predict and remove source side multiples in the SRME process.

Similarly, and now with respect to FIG. 5(b), seismic interferometry is applied to the acquired OBC data to generate new seismic data associated with raypath $R_iR_j$ 540, 542 which is also not directly available from the OBC acquisition's recorded seismic data. In the example of FIG. 5(b), new seismic data is generated which is data that would have been recorded by the receivers on the ocean floor 510 if the sources were also located on the ocean floor 510. This new seismic data can be used, e.g., in conjunction with the originally acquired seismic data, to predict and remove receiver side multiples in the SRME process.

It will be appreciated by those skilled in the art that various embodiments thus enable the removal of both source side and receiver side multiples or, alternatively, only source side multiples or only receiver side multiples in which latter cases only corresponding data needs to be generated using seismic interferometry.

Figure 6:
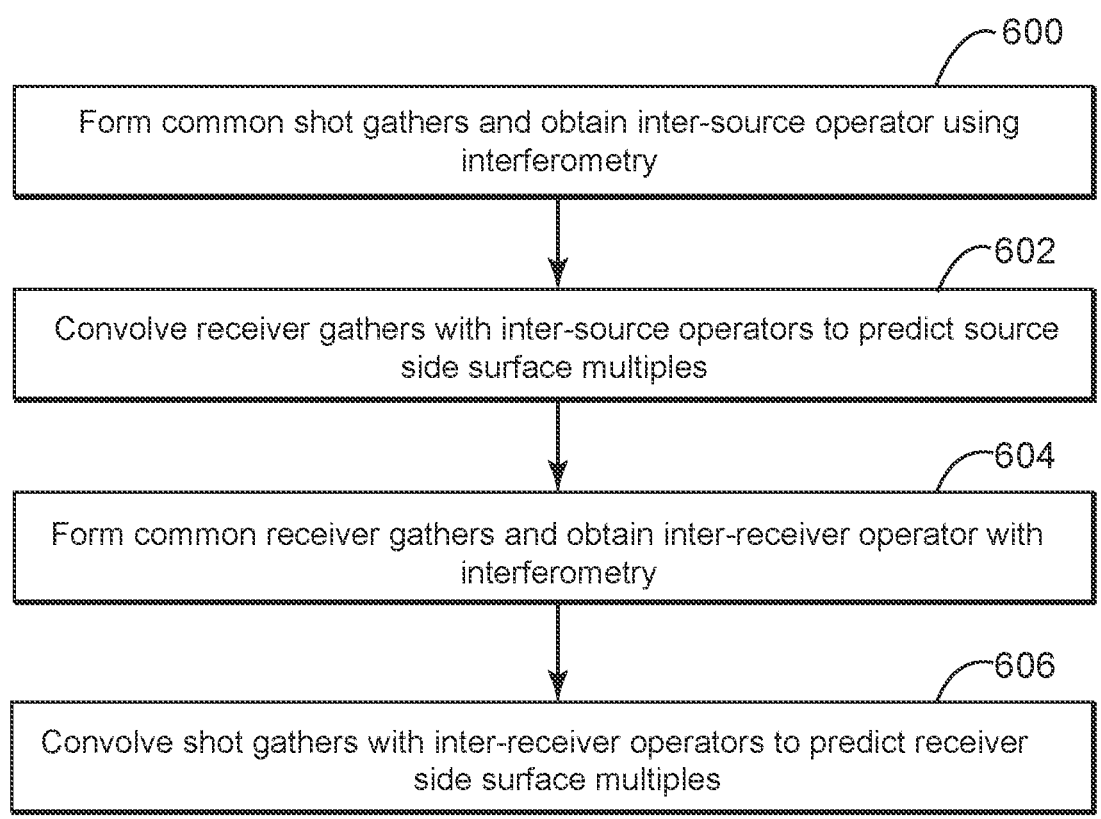
FIG. 6 is a flowchart illustrating a method for processing seismic data according to an embodiment.

Thus, according to a method embodiment, the steps illustrated in FIG. 6 can be performed according to an embodiment as part of the processing of recorded or received seismic data by, e.g., an OBC system. At step 600, common shot gathers are formed and used in the interferometry process described above to obtain the new seismic data, e.g., an inter-source operator. Then, at step 602, the common receiver shot gathers and the inter-source operator are convolved to predict the source side surface multiples. Similarly, in steps 604 and 606, the new seismic data, e.g., an inter-receiver operator, is determined using interferometry, and then the inter-receiver operator is used to predict the receiver side source multiples, respectively. As mentioned earlier, according to one embodiment both source side and receiver side multiples can be predicted (and subsequently removed) using, e.g., steps 600-606. Alternatively, according to other embodiments only source side multiples (e.g., steps 600 and 602), or only receiver side multiples (e.g., steps 604 and 606) can be predicted (and subsequently removed).

Figure 7:
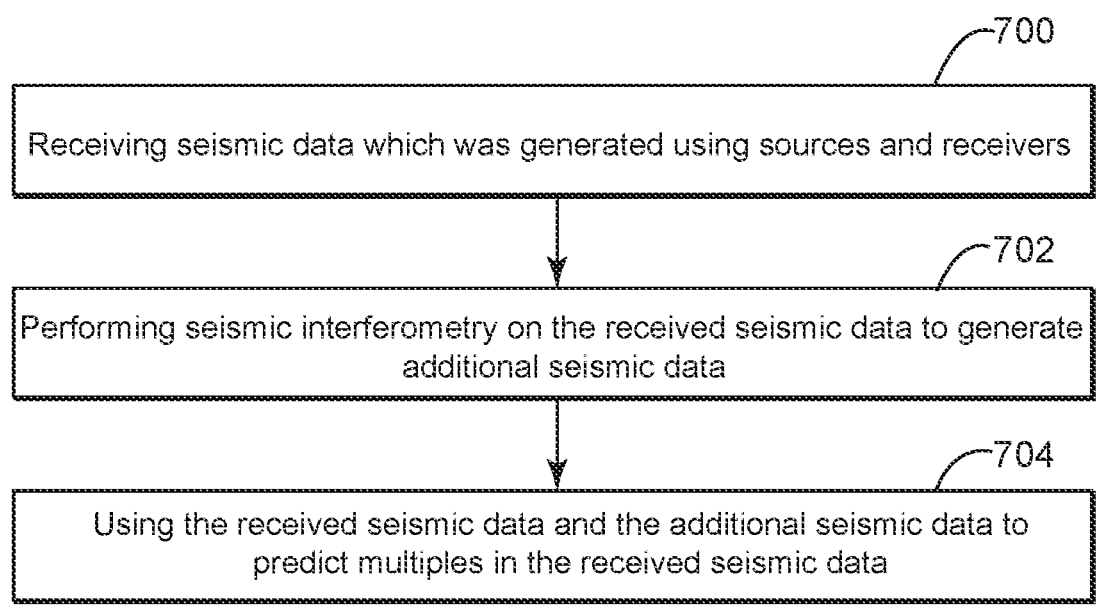
FIG. 7 illustrates a flow diagram of a method for processing seismic data according to another embodiment.

Method embodiments can, for example, be expressed as set forth above with respect to FIG. 6. Other method embodiments are also possible, another example of which is provided with respect to FIG. 7. Therein at step 700, the seismic data which was generated using sources and receivers, e.g., as acquired by an OBC seismic acquisition system, is received. In this context, the term "received" refers to a processor receiving the seismic data for processing. This can occur, for example, in a processing center to which the data has been transferred via some form of electronic media or file. Then, at step 702, seismic interferometry is performed on the received seismic data to generate additional seismic data. Both the received seismic data and the additional seismic data are used at step 704 to predict multiples in the received seismic data.

Figure 8:
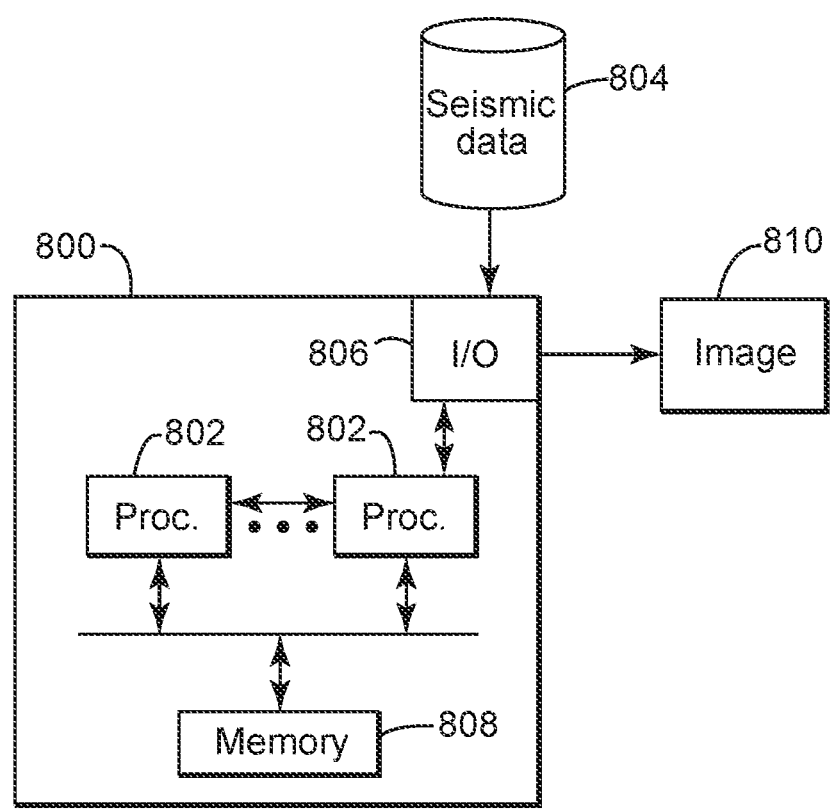
FIG. 8 illustrates a block diagram of a system that can implement the embodiments.

In addition to methods, other embodiments can be expressed as systems, e.g., processing system to process the data in the manner described above. An example is illustrated in FIG. 8. Therein, one or more processors 802 can receive input seismic data 804 via input/output device(s) 806. The seismic data can be processed to predict (and then remove) surface multiples (source and/or receiver) by configuring the one or more processors to perform interferometry as described above to generate the additional seismic data needed to predict the multiples using techniques such as SRME. The received and processed data can be stored in the memory device 808 during the various stages of the seismic data processing. When the seismic data processing is complete, one or more images 810 of the subsurface associated with the seismic data can be generated either as a displayed image on a monitor, a hard copy on a printer or an electronic image stored to a removable memory device.

The one or more processors 802 can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

Exemplary embodiments discussed herein can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include ROM, RAM, CDROMs and generally optical data storage devices, magnetic tapes, flash drives, and floppy disks. The computer-readable recording medium can also be distributed over network coupled computer systems so that the computer-readable code is stored and executed in a distributed fashion. Also, functional programs, codes, and code segments to, when implemented in suitable electronic hardware, accomplish or support exercising certain elements of the appended claims can be readily construed by programmers skilled in the art to which the embodiments pertains.

The above-described exemplary embodiments are intended to be illustrative in all respects, rather than restrictive, of the present invention. Thus the present invention is capable of many variations in detailed implementation that can be derived from the description contained herein by a person skilled in the art. No element, act, or instruction used in the description of the present application should be construed as critical or essential to the invention unless explicitly described as such. Also, as used herein, the article "a" is intended to include one or more items.

We claim:

1. A method for marine seismic exploration, the method comprising:
   receiving seismic data which was acquired by receivers detecting seismic excitations generated by sources and traveling through an explored subsurface, wherein either the sources or the receivers are located on an ocean floor;
   performing seismic interferometry on the received seismic data to generate additional seismic data simulating the receivers and the sources being located both at a same depth;
   using the received seismic data and the additional seismic data to predict source- side and receiver-side multiples in the received seismic data;
   performing surface related multiple elimination from the received seismic data based on the predicted multiples to obtain imaging data; and
   ascertaining presence of hydrocarbon reservoirs in the subsurface based on the imaging data.

2. The method of claim 1, wherein said sources and receivers are spaced apart depthwise by at least 20 m.

3. The method of claim 1, wherein the received seismic data was generated using an Ocean Bottom Cable (OBC) system.

4. The method of claim 3, wherein the additional seismic data is one of: data that would have been recorded by the receivers if the receivers were instead located at the ocean surface or data that would have been recorded by the receivers on the ocean floor if the sources were also located on the ocean floor.

5. The method of claim 1, wherein the step of performing seismic interferometry further comprises:
cross-correlating recordings of wave fields at two receiver positions to generate a Green's function that would have been observed at one of the two receiver positions if there had been an impulsive source at the other one of the two receiver positions.

6. The method of claim 5, wherein the step of cross-correlating further comprises calculating:

$$R\{G(X_A, X_B, \omega)\} = \int_{\partial D} \frac{-1}{j\omega\rho(X)}$$
$$(G^*(X_A, X, \omega)\partial_i G(X_B, X, \omega) - \partial_i G^*(X_A, X, \omega)G(X_B, X, \omega))n_i d^2x$$

where R denotes the real part, G refers to Green's function, $\rho$ refers to density, n refers to a normal direction of a boundary, j refers to $\sqrt{-1}$, $\omega$ refers to frequency;
super script * refers to the complex conjugate; X refers to locations and D refers to an enclosed boundary.

7. A system for marine seismic exploration, the system comprising:
at least one seismic source configured to generate seismic excitations;
receivers configured to detect the seismic excitations traveling through an explored subsurface under the seafloor and to generate seismic data representing the detected seismic excitations, wherein either the sources or the receivers are located on an ocean floor; and
a processor configured
to receive the seismic data,
to perform seismic interferometry on the received seismic data to generate additional seismic data simulating the receivers and the sources being located both at a same depth,
to use the received seismic data and the additional seismic data to predict source-side and receiver-side multiples,
to perform surface related multiple elimination from the received seismic data based on the predicted source-side and receiver-side multiples to obtain imaging data; and
to ascertain presence of hydrocarbon reservoirs in the subsurface based on the imaging data.

8. The system of claim 7, wherein said sources and receivers are spaced apart depthwise by at least 20 m.

9. The system of claim 7, wherein the received seismic data was generated using an Ocean Bottom Cable (OBC) system.

10. The system of claim 9, wherein the additional seismic data is one of: data that would have been recorded by the receivers if the receivers were instead located at the ocean surface or data that would have been recorded by the receivers on the ocean floor if the sources were also located on the ocean floor.

11. The system of claim 7, wherein the processor performs seismic interferometry further by cross-correlating recordings of wave fields at two receiver positions to generate a Green's function that would have been observed at one of the two receiver positions if there had been an impulsive source at the other one of the two receiver positions.

12. The system of claim 11, wherein the processor performs the cross-correlating by calculating:

$$R\{G(X_A, X_B, \omega)\} = \int_{\partial D} \frac{-1}{j\omega\rho(X)}$$
$$(G^*(X_A, X, \omega)\partial_i G(X_B, X, \omega) - \partial_i G^*(X_A, X, \omega)G(X_B, X, \omega))n_i d^2x$$

where R denotes the real part, G refers to Green's function, $\rho$ refers to density, n refers to a normal direction of a boundary, j refers to $\sqrt{-1}$, $\omega$ refers to frequency;
super script * refers to the complex conjugate; X refers to locations and D refers to an enclosed boundary.

13. A non-transitory computer-readable medium containing program instructions which, when executed on a suitably programmed computer processing device, perform the steps of:
receiving seismic data acquired by receivers detecting seismic excitations generated by sources and traveling through an explored subsurface, wherein either the sources or the receivers are located on an ocean floor;
performing seismic interferometry on the received seismic data to generate additional seismic data simulating the receivers and the sources being located both at a same depth;
using the received seismic data and the additional seismic data to predict source-side and receiver-side multiples in the received seismic data;
performing surface related multiple elimination from the received seismic data based on the predicted source-side and receiver-side multiples to obtain imaging data; and
ascertaining presence of hydrocarbon reservoirs in the subsurface based on the imaging data.

14. The non-transitory computer-readable medium of claim 13, wherein said sources and receivers are spaced apart depthwise by at least 20 m.

15. The non-transitory computer-readable medium of claim 13, wherein the received seismic data was generated using an Ocean Bottom Cable (OBC) system.

16. The non-transitory computer-readable medium of claim 15, wherein the additional seismic data is one of: data that would have been recorded by the receivers, which are located on the ocean floor, if the receivers were instead located at the ocean surface or data that would have been recorded by the receivers on the ocean floor if the sources were also located on the ocean floor.

17. The non-transitory computer-readable medium of claim 13, wherein the step of performing seismic interferometry further comprises:
cross-correlating recordings of wave fields at two receiver positions to generate a Green's function that would have been observed at one of the two receiver positions if there had been an impulsive source at the other one of the two receiver positions.

18. The non-transitory computer-readable medium of claim 17, wherein the step of cross-correlating further comprises calculating:

$$\mathcal{R}\{G(X_A, X_B, \omega)\} = \int_{\partial D} \frac{-1}{j\omega\rho(X)}$$
$$(G^*(X_A, X, \omega)\partial_i G(X_B, X, \omega) - \partial_i G^*(X_A, X, \omega)G(X_B, X, \omega))n_i d^2 x$$

where R denotes the real part, G refers to Green's function, ρ refers to density, n refers to a normal direction of a boundary, j refers to $\sqrt{-1}$, ω refers to frequency;

super script * refers to the complex conjugate; X refers to locations and D refers to an enclosed boundary.

* * * * *